(12) United States Patent
Zhao et al.

(10) Patent No.: US 11,813,756 B2
(45) Date of Patent: Nov. 14, 2023

(54) DISASSEMBLY BASED ASSEMBLY PLANNING

(71) Applicant: FANUC CORPORATION, Yamanashi (JP)

(72) Inventors: Yu Zhao, Union City, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 17/226,179

(22) Filed: Apr. 9, 2021

(65) Prior Publication Data

US 2021/0323154 A1    Oct. 21, 2021

Related U.S. Application Data

(60) Provisional application No. 63/010,724, filed on Apr. 16, 2020.

(51) Int. Cl.
*B25J 9/16* (2006.01)

(52) U.S. Cl.
CPC ................... *B25J 9/1687* (2013.01)

(58) Field of Classification Search
CPC ....... B25J 9/1687; B25J 9/1666; B25J 9/1664
See application file for complete search history.

(56) References Cited

U.S. PATENT DOCUMENTS 5,452,238 A     9/1995  Kramer et al.
6,157,902 A *  12/2000  Hirata ................ G05B 19/4069
                                                              700/95

(Continued)

FOREIGN PATENT DOCUMENTS

CN     103235862 A     8/2013
WO     2011067621 A1   6/2011

OTHER PUBLICATIONS

Translation of CN-103235862-A. Liu et al. Selecting a Disassembly Sequence Planning Method and Device. Aug. 7, 2013. (Year: 2013).*

(Continued)

*Primary Examiner* — Ryan Rink
*Assistant Examiner* — Tien Minh Le
(74) *Attorney, Agent, or Firm* — Shumaker, Loop & Kendrick, LLP (57) ABSTRACT

A robot motion planning technique for component assembly operations. Inputs to the motion planning technique include geometric models of the components being assembled, and initial and target configurations. The method begins at a tightly-constrained target or final configuration and plans in the direction of a loosely-constrained initial configuration. A randomly-sampled waypoint configuration is proposed, followed by a local search for feasible configurations which generates nodes that extend a path toward the initial configuration while sliding through the tightly-constrained region. The local search can be repeated multiple times for a given randomly-sampled configuration. When a completed path is found, the action sequence is trimmed to eliminate unnecessary extraneous motions in the loosely-constrained region. The disclosed method dramatically reduces the number of unproductive configurations evaluated and finds assembly solutions much faster in comparison to known tree-based motion planning methods.

20 Claims, 7 Drawing Sheets

(56) References Cited

U.S. PATENT DOCUMENTS

| | | | |
|---|---|---|---|
| 6,725,184 B1* | 4/2004 | Gadh | G05B 19/41805 703/22 |
| 7,974,737 B2 | 7/2011 | Tilove et al. | |
| 8,483,874 B2 | 7/2013 | Kim et al. | |
| 8,924,016 B2 | 12/2014 | Kim et al. | |
| 10,279,476 B2 | 5/2019 | Jaekel et al. | |
| 10,369,695 B2 | 8/2019 | Lee | |
| 2008/0125893 A1* | 5/2008 | Tilove | B25J 9/1666 700/103 |
| 2012/0165982 A1* | 6/2012 | Kim | B25J 9/162 700/262 |
| 2018/0001472 A1 | 1/2018 | Konidaris et al. | |
| 2019/0232496 A1 | 8/2019 | Graichen et al. | |
| 2019/0366543 A1 | 12/2019 | Butterfoss | |
| 2021/0150799 A1* | 5/2021 | Yang | B60W 50/06 |
| 2021/0178590 A1* | 6/2021 | Mao | B25J 9/1666 |

OTHER PUBLICATIONS

Juan Cortés, Léonard Jaillet, and Thierry Siméon. "Disassembly Path Planning for Complex Articulated Objects." IEEE Transactions on Robotics 24.2 (2008): 475-481.

Anna Yershova, and Steven M. Lavalle. "Motion Planning for Highly Constrained Spaces." Robot motion and control 2009. Springer, London, 2009. 297-306.

Russell Gayle, Stephane Redon, Avneesh Sud, Ming C. Lin, and Dinesh Manocha. "Efficient Motion Planning of Highly Articulated Chains Using Physics-Based Sampling." Proceedings 2007 IEEE International Conference on Robotics and Automation. IEEE, 2007.

* cited by examiner

DISASSEMBLY BASED ASSEMBLY PLANNING

CROSS-REFERENCE TO RELATED APPLICATIONS

This application claims the benefit of the priority date of U.S. Provisional Patent Application Ser. No. 63/010,724, titled DISASSEMBLY BASED ASSEMBLY PLANNING, filed Apr. 16, 2020.

BACKGROUND

Field

The present disclosure relates to the field of industrial robot motion planning and, more particularly, to a robot motion planning technique for component assembly operations which begins at a tightly-constrained target configuration and plans in the direction of a loosely-constrained initial configuration, where a randomly-sampled configuration is followed by a local search which generates nodes that extend a path toward the initial configuration while sliding through the tightly-constrained region.

Discussion of the Related Art

The use of industrial robots to perform a wide range of manufacturing, assembly and material movement operations is well known. One such application is to use one or more robots to assemble individual component parts into a product. In component assembly operations, it is very common for the assembled configuration of two parts to include multiple contact points and surfaces, such as tabs in slots, pins in holes, direct contact of adjacent surfaces, etc., in order to hold the two parts in proper relative orientation. These contact points and surfaces represent constraints which require the assembly motion to be very precise as the two parts are brought together.

Humans are good at using visual and tactile senses along with intuition to assemble components in the manner described above. However, it is desirable to use robots for such repetitive tasks, for reasons of cost-effectiveness and consistent quality among others. Using a human to teach a robot the proper assembly sequence is time consuming and costly, as a precise motion sensing environment must be set up to enable accurate motion capture of the assembly sequence. In addition, human assembly of parts often includes a lot of trial and error characterized by small movements to get the parts to fit into their proper engagement, and it is not desirable to capture those small extraneous movements in a robot motion program. For these reasons, computer-based assembly motion planning techniques have been evaluated to replace human teaching.

Prior art techniques for computer-based assembly motion planning have been disclosed which are based on the rapidly exploring random tree (RRT) method. RRT rapidly and randomly builds a space-filling tree of nodes until it finds a path from an initial configuration to a final configuration. Given math models (surface or solid models) of two components to be assembled, and their initial and final configurations relative to each other, RRT can be used to find an assembly motion sequence. However, because of the tightly-constrained target configuration of the two components, the chances are very low of RRT finding path waypoints defining a sequence of movements having exactly the right relative position and orientation of the parts. Thus, RRT-based techniques for assembly planning of tightly-constrained components has been found to be inefficient.

Other known computer-based assembly planning systems are rule-based and use geometric constraints and rules, such as planar and cylindrical constraints of relative part configurations. This type of system can be more efficient than the RRT-based technique, but can typically only handle simple part geometries because of the need to define rules for each potential interface.

In light of the circumstances described above, there is a need for an improved robot motion planning technique for component assembly operations which can handle the complex geometries typical of real components, and can also efficiently plan an assembly motion for tightly-constrained components.

SUMMARY

In accordance with the teachings of the present disclosure, a robot motion planning technique for component assembly operations is disclosed. Inputs to the motion planning technique are geometric models of the components being assembled, and initial and target configurations. The method begins at a tightly-constrained target or final configuration and plans in the direction of a loosely-constrained initial configuration. A randomly-sampled waypoint is proposed, followed by a local search for feasible configurations which generates nodes that extend a path toward the initial configuration while sliding through the tightly-constrained region. The local search can be repeated multiple times for a given randomly-sampled configuration. When a completed path is found, the action sequence is trimmed to eliminate unnecessary extraneous motions in the loosely-constrained region. The disclosed method dramatically reduces the number of unproductive configurations evaluated and finds assembly solutions much faster in comparison to known tree-based motion planning methods.

Additional features of the presently disclosed devices and methods will become apparent from the following description and appended claims, taken in conjunction with the accompanying drawings.

BRIEF DESCRIPTION OF THE DRAWINGS

FIGS. 8A, 8B and 8C are illustrations of the two components being assembled as shown in FIGS. 1A, 1B, 1C and 1D, where FIG. 8A shows motion planning results from an RRT technique known in the art, FIG. 8B shows motion planning results from an RRT-Connect technique known in the art, and FIG. 8C shows motion planning results from the techniques of the present disclosure.

DETAILED DESCRIPTION OF THE EMBODIMENTS

The following discussion of the embodiments of the disclosure directed to a disassembly-based assembly motion planning technique using local constraint-escaping search is merely exemplary in nature, and is in no way intended to limit the disclosed devices and techniques or their applications or uses.

Humans are good at assembling components into completed products, being able to use visual and tactile senses along with intuition to fit the components together even when the fit is tight and the required motions are intricate. However, it is desirable to use robots for such repetitive tasks, for reasons of cost-effectiveness and consistent quality of the product, and to eliminate the tedium and repetitive motion for human workers. It is known to use a human to teach a robot the proper assembly sequence and motion. Unfortunately, human teaching of assembly motions is time consuming and costly, as a precise motion sensing environment must be set up to enable accurate motion capture of the assembly sequence. In addition, human assembly of parts often includes a lot of trial and error characterized by small movements to get the parts to fit into their proper engagement. It is not desirable to include these small trial and error human motions in a robot motion program. For these reasons, computer-based assembly motion planning techniques have been developed to replace human teaching.

FIGS. 1A, 1B, 1C and 1D are illustrations of two components being assembled, where traditional robotic motion planning techniques are very inefficient, and highlighting the need for an improved motion planning technique. Many products are designed with components having integral features which are used to ensure proper fit and alignment with a mating component. These features—such as pins and holes, tabs and slots, nesting geometric shapes, etc.—require that the assembly of the components follows a very precise motion sequence. This type of situation is illustrated in FIGS. 1A, 1B, 1C and 1D.

A first component 110 is to be assembled onto a second component 120. The components 110 and 120 could be any two parts—such as two pieces of a computer chassis as shown here. During assembly, the component 120 is fixed in place, and the component 110 is moved along a path to fit into its final position mated with the component 120. Finding the motion path of the component 110 relative to the fixed position of the component 120 is the goal of the motion planning computation. The geometry of the components 110 and 120 are known and are provided as input to the motion planning computation—typically in the form of CAD solid or surface models.

Figure 1A:
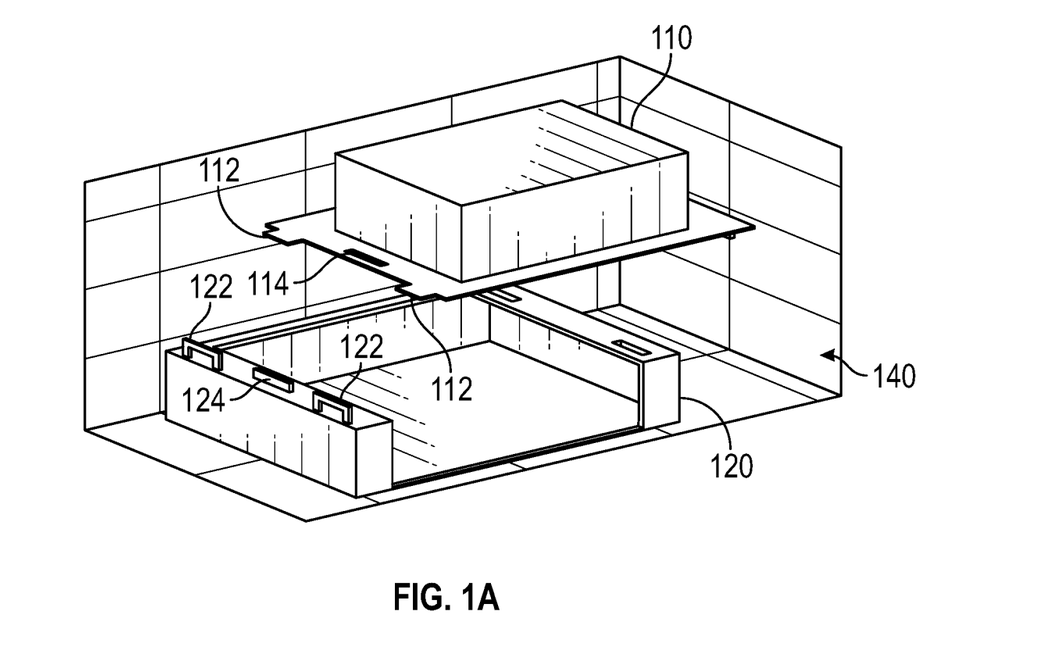
FIGS. 1A, 1B, 1C and 1D are illustrations of two components being assembled, where traditional robotic motion planning techniques are very inefficient, and highlighting the need for an improved motion planning technique.
Figure 1B:
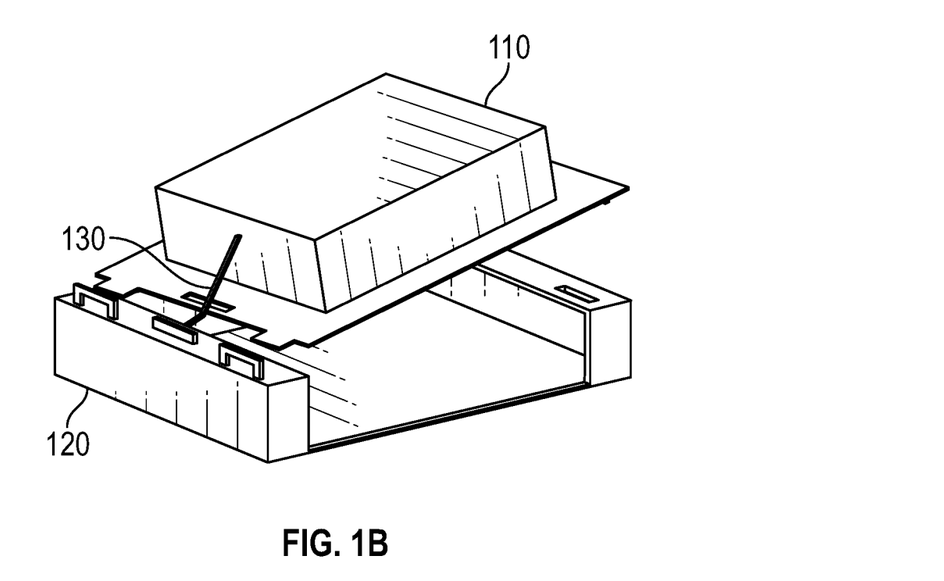
Figure 1C:
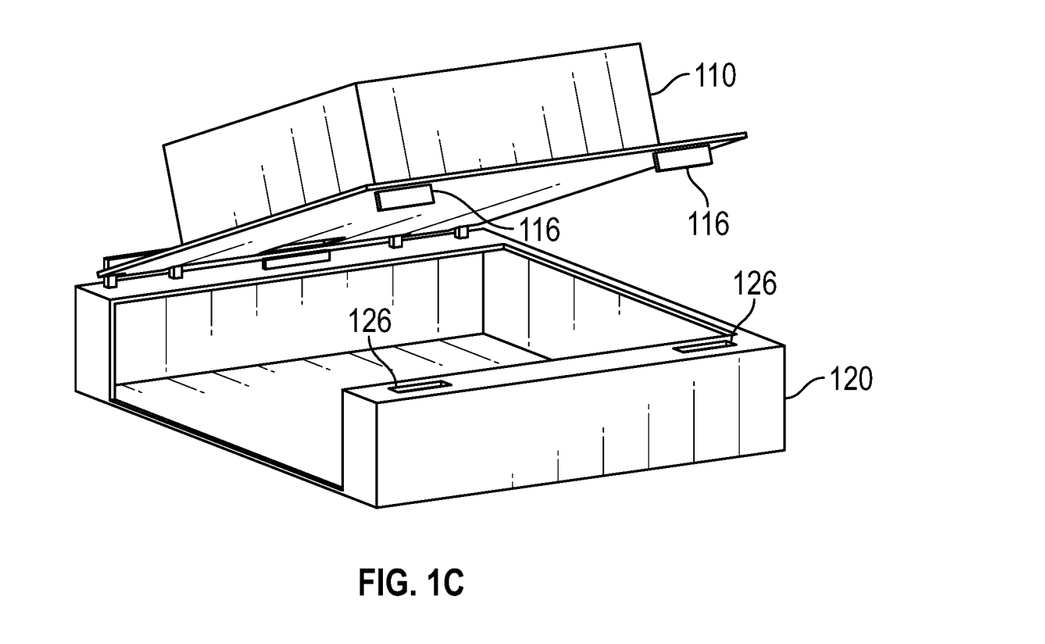
Figure 1D:
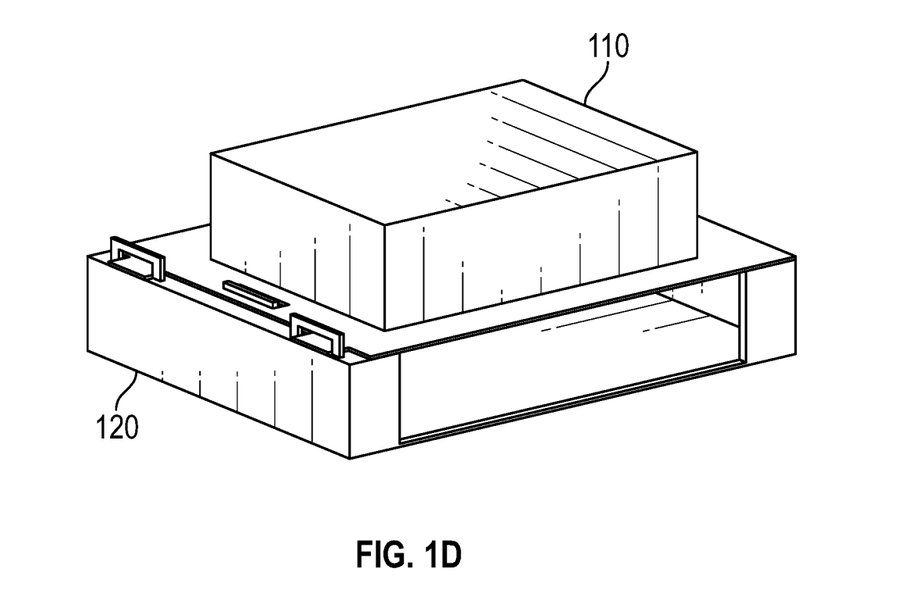

FIG. 1A shows the components 110 and 120 in an initial position before assembly. FIG. 1D shows the components 110 and 120 in a final position after being assembled. FIGS. 1B and 1C show two different views of the components 110 and 120 in an intermediate position during assembly, where the motion of the component 110 along a path 130 with a particular approach angle is apparent. A three-dimensional spatial grid 140 is shown in FIG. 1A, illustrating that the component geometries and their configurations during motion are computed in a common fixed coordinate frame. Throughout the following discussion, the "configuration" of a component is to be understood to mean position and orientation of the component in the defined coordinate frame. That is, the configuration of the component 110 relative to the fixed component 120 includes all six degrees of freedom (DOF)—three positions and three rotation angles, where the rotation angles may be defined as yaw/pitch/roll about a local coordinate frame, or Euler angles or any other suitable angular orientation convention.

The components 110 and 120 include several integral features which ensure that the parts fit together tightly and in the proper alignment. Tabs 112 on one end of the component 110 must fit into slots 122 on the component 120. Similarly, a tab 124 on the component 120 must fit into a slot 114 on the component 110. At the other end of the component 110, visible in FIG. 1C, tabs 116 must fit into slots 126 in the component 120.

It is apparent from the illustrations that the assembly of the component 110 onto the component 120 must follow a precise motion sequence—including tipping the component 110 to a particular angle, moving the component 110 so that at least one of the tabs 112 begins to engage one of the slots 122, and tipping the component 110 back to a level orientation while sliding it slightly forward. This type of precise six DOF motion planning, for the purposes of having a robot perform the assembly operation, presents a significant challenge for known motion planning techniques.

Prior art techniques for computer-based assembly motion planning have been disclosed which are based on the rapidly-exploring random tree (RRT) method. RRT rapidly and randomly builds a space-filling tree of nodes until it finds a path from an initial configuration to a final configuration. Given math models (surface or solid models) of two components to be assembled, and their initial and final configurations relative to each other, RRT can be used to find an assembly motion sequence. Each node in RRT motion planning must be evaluated and determined to be collision-free in order to be included as a valid or feasible waypoint. However, because of the tightly-constrained target configuration of the two components, the chances are very low of RRT finding path waypoints defining a sequence of movements having exactly the right relative position and orientation of the parts. Thus, RRT-based techniques for assembly planning of tightly-constrained components has been found to be ineffective.

Other known computer-based assembly planning systems are rule-based and use geometric constraints and rules, such as planar and cylindrical constraints of relative part configuration. This type of system can be more efficient than the RRT-based technique, but can typically only handle simple part geometries because of the need to define rules for each potential interface.

In order to more intuitively describe the challenges of known RRT-based motion planning techniques, and the advantages of the techniques of the present disclosure, the next several figures will be used to illustrate some key concepts of motion planning and constraint observance in two dimensions.

Figure 2:
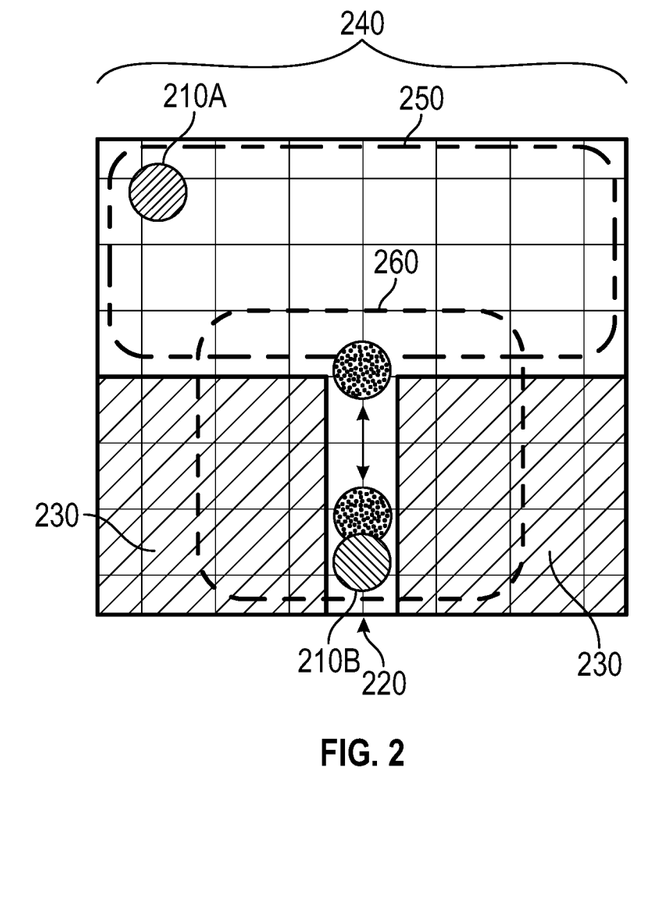
FIG. 2 is a two-dimensional illustration of a simple assembly of a ball into a slot, showing the loosely-constrained nature of an initial configuration and the tightly-constrained nature of a target configuration as is commonly encountered in component assembly operations.

FIG. 2 is a two-dimensional illustration of a simple assembly of a ball into a slot, showing the loosely-constrained nature of an initial configuration and the tightly-constrained nature of a target configuration as is commonly encountered in component assembly operations. A ball 210 is shown in an initial configuration 210A at the top left, and in a target configuration 210B at the bottom center. In the target configuration 210B, the ball 210 is positioned in a slot 220 of a structure 230. The ball 210 fits in the slot 220 with a very small clearance.

A workspace 240 (the entire grid) is defined as the configuration space in which the ball 210 can move relative to the structure 230. Near the initial configuration 210A and elsewhere above the slot 220, the workspace 240 is characterized by a loosely-constrained region 250, wherein the ball 210 can move freely without interference with the structure 230. In contrast, near the target configuration 210B and elsewhere in the vicinity of the slot 220, the workspace 240 is characterized by a tightly-constrained region 260, wherein the ball 210 must be almost perfectly centered in the slot 220 in order to avoid interference with the structure 230. The phantom (dotted) images of the ball 210 in FIG. 2 illustrate the only feasible positions of the ball 210 within the tightly-constrained region 260.

Figure 3:
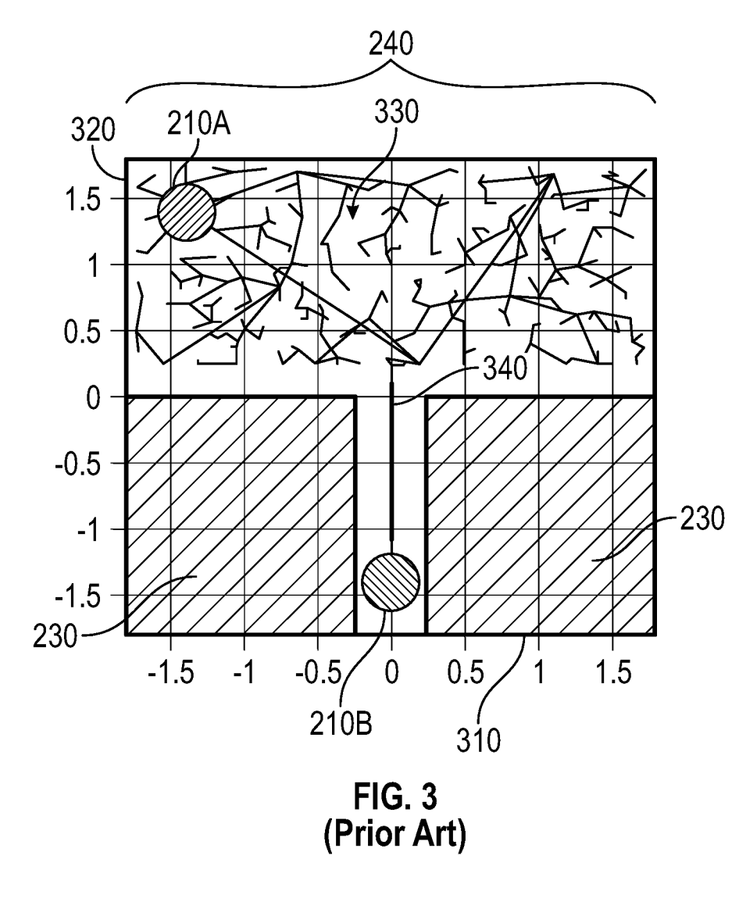
FIG. 3 is an illustration of the ball and slot assembly arrangement of FIG. 2, where random tree motion planning methods have difficulty finding a path into the tightly-constrained region, according to techniques known in the art.

FIG. 3 is an illustration of the ball and slot assembly arrangement of FIG. 2, where random tree motion planning methods have difficulty finding a path into the tightly-constrained region, according to techniques known in the art. FIG. 3 illustrates the same workspace 240 as in FIG. 2. A horizontal axis 310 and a vertical axis 320 are included to show that the workspace 240 and the motion of the ball 210 are geometrically mapped, in two dimensions in this case.

Beginning from the initial configuration 210A, a traditional RRT motion planning routine attempts to find a path to the target configuration 210B. As would be understood by one skilled in the art, RRT selects random waypoints in the configuration space and evaluates each point for feasibility (i.e., freedom from collisions with the structure 230). Feasible waypoints are saved as nodes in a tree 330, and branches grow from each node until a waypoint is evaluated which is infeasible, which terminates that branch.

It can be seen in FIG. 3 that the tree 330 grows to completely fill the loosely-constrained region 250. However, after many iterations, the RRT technique has failed to find a path from the initial configuration 210A to the target configuration 210B. In order to find a path to the target configuration 210B, a node on the tree 330 would have to land precisely on a slot centerline 340 in the loosely-constrained region 250, and then a waypoint would have to be tried which is precisely on the slot centerline 340 in the tightly-constrained region 260. Even with the rapid growth of the tree 330, the chances of any individual branch finding its way into the slot 220 are so low that the RRT motion planning technique is extremely slow.

In light of the inefficiency of RRT techniques described above, there is a need for an improved robot motion planning technique for component assembly operations which can handle the complex geometries typical of real components, and can also efficiently plan an assembly motion for tightly-constrained components.

Figure 4:
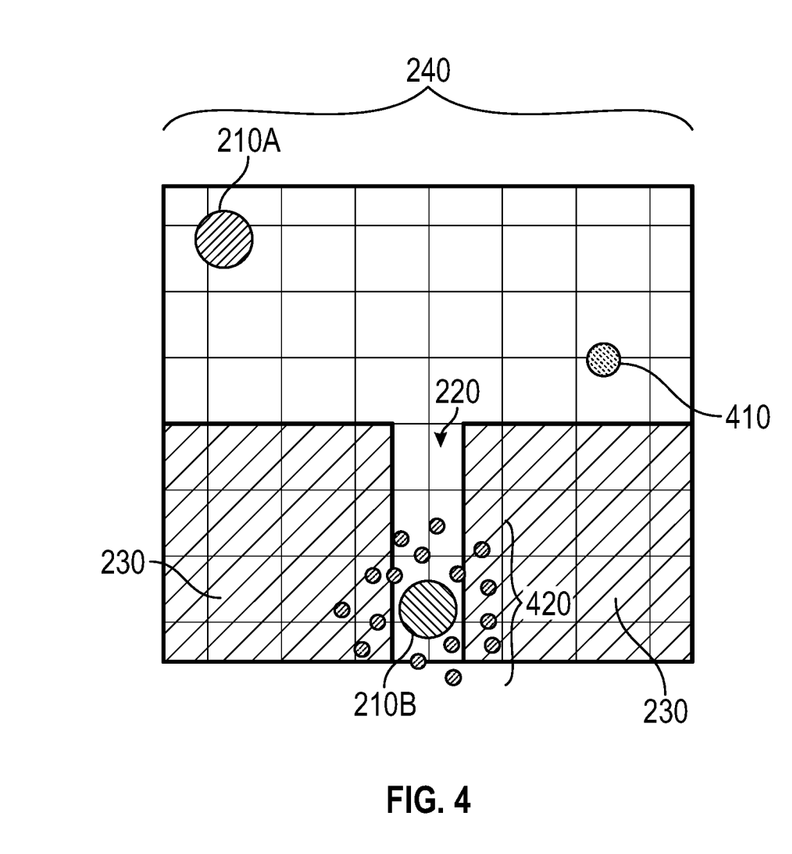
FIG. 4 is an illustration of the ball and slot assembly arrangement of FIGS. 2-3, where motion planning begins at the target configuration, a randomly-selected waypoint configuration is selected, and a plurality of local samples are defined, according to an embodiment of the present disclosure.

FIG. 4 is an illustration of the ball and slot assembly arrangement of FIGS. 2-3, where motion planning begins at the target configuration 210B, a randomly-selected waypoint configuration is chosen, and a plurality of local samples are defined, according to an embodiment of the present disclosure. Compared to the RRT-based method shown in FIG. 3, the techniques of the present disclosure drastically reduce the number of unproductive configurations which are evaluated in building a sequence of waypoints. When considering that collision avoidance calculations must be performed at each potential waypoint configuration in the motion planning sequence, the dramatic reduction in the number of configurations evaluated results in a much more efficient motion planning process.

FIG. 4 (and FIGS. 5-7 which follow) illustrate the motion planning techniques of the present disclosure in terms of the same ball and slot assembly and the workspace 240 of FIGS. 2-3. The ball 210 is shown in both the initial configuration 210A and the target configuration 210B, along with the slot 220 in the structure 230 as before. In the method of the present disclosure, the motion planning sequence begins at the target configuration 210B. By beginning in a tightly-constrained region (inside the slot 220 in this case), the disclosed method avoids building a tree of nodes and branches in many locations which will not be productive (as was done in the RRT-based prior art technique shown in FIG. 3).

Beginning from the target configuration 210B, the method randomly proposes a waypoint 410 in configuration space. The configuration space in the case of FIGS. 4-7 is the two-dimensional workspace 240, and rotation of the ball 210 is not shown because it is a round ball, but in the general case the configuration space is three-dimensional and each configuration is defined in terms of all six degrees of freedom (DOF)—i.e., three translations and three rotations.

Following the random definition of the waypoint 410, a set 420 of local samples is evaluated in a local vicinity of the existing waypoint closest to the proposed waypoint, which in this case is the target configuration 210B. The set 420 of local samples is configurable in terms of quantity (16 of them are shown in FIG. 4) and in terms of distance in configuration space from the existing waypoint (the configuration 210B). The maximum distance in configuration space in a general 3D case would include a maximum translational distance (such as 10% of a size of the workspace 240) and a maximum angular rotation (such as 10°). These maximum ranges in configuration space for the local samples are merely exemplary, and are configurable to any suitable values. The configurations in the set 420 are randomly defined within the confines of the local configuration space maximum ranges. Each of the configurations in the set 420 of local samples is then evaluated to determine if it satisfies the requirement of being collision-free. The idea is that, by starting in the tightly-constrained region and evaluating many local samples at close range, the chances are increased of finding one or more feasible (collision-free) configurations, and using the feasible configurations to build the motion plan.

Figure 5:
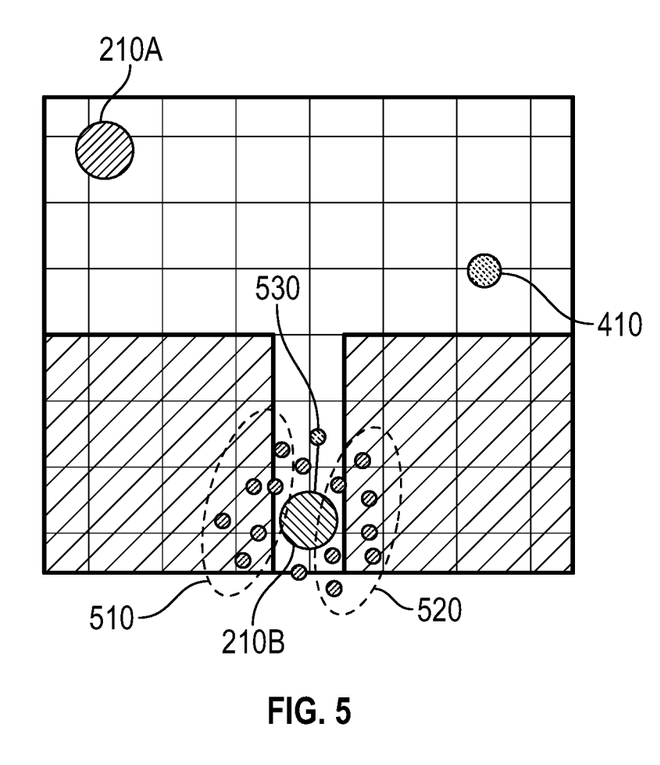
FIG. 5 is an illustration of the ball and slot assembly arrangement of FIG. 4, where the local sample configurations are evaluated to identify which sample is free of collision and is closest to the randomly-selected configuration, according to an embodiment of the present disclosure.

FIG. 5 is an illustration of the ball and slot assembly arrangement of FIG. 4, where the local sample configurations are evaluated to identify which sample is free of collision and is closest to the randomly-selected configuration, according to an embodiment of the present disclosure. FIG. 5 shows the next step in the disclosed method, which is to evaluate each configuration in the set 420 of local samples, eliminate any of the configurations in the set 420 which are not collision-free (i.e., not feasible), and then select the feasible configuration which is closest to the proposed waypoint 410.

A subset 510 of the configurations in the set 420 are infeasible because the ball 210 interferes with the structure 230 to the left of the slot 220. Similarly, a subset 520 of the configurations in the set 420 are infeasible because the ball 210 interferes with the structure 230 to the right of the slot 220. Of the remaining configurations in the set 420, a configuration point 530 is identified as being the closest in configuration space to the proposed waypoint 410. The configuration point 530 therefore becomes a confirmed waypoint in the motion plan. In the two-dimensional space of FIG. 5, the meaning of "closest" is simply minimum distance in the plane. In the three-dimensional configuration space of real parts, the closest point can be identified using a defined calculation including the translational distance (square root of the sum of the squares of the differences in x/y/z coordinates) along with the rotational "distance" (such as the square root of the sum of the squares of the differences in orientation angles) with appropriate weighting factors.

Figure 6:
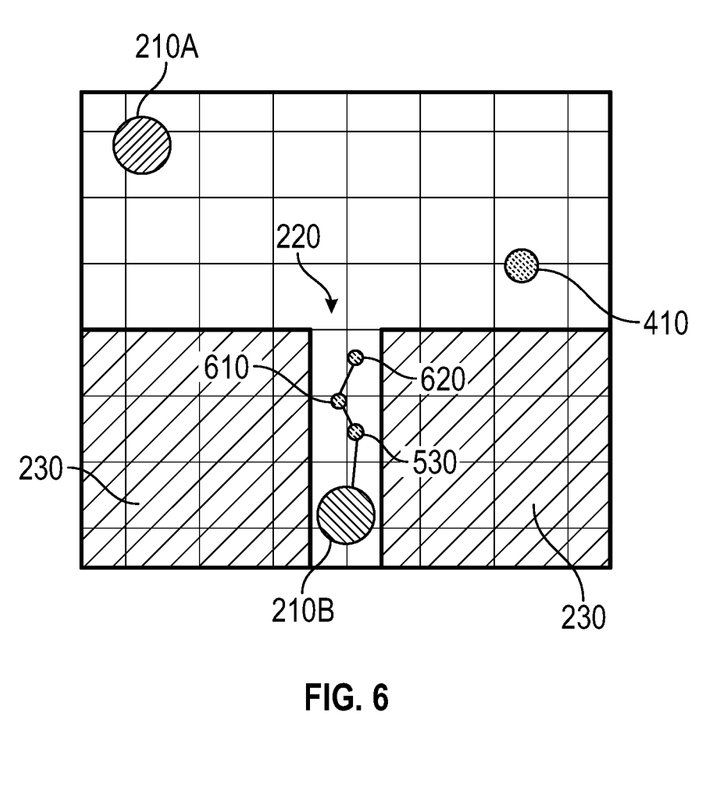
FIG. 6 is an illustration of the ball and slot assembly arrangement of FIGS. 4-5, where additional local sample configurations are evaluated relative to the same previously-selected random configuration, resulting in waypoints which incrementally move the planned path out of the tightly-constrained region, according to an embodiment of the present disclosure.

FIG. 6 is an illustration of the ball and slot assembly arrangement of FIGS. 4-5, where additional local sample configurations are evaluated relative to the same previously-selected random configuration, resulting in waypoints which incrementally move the planned path out of the tightly-constrained region, according to an embodiment of the present disclosure. FIG. 6 shows the next step in the disclosed method, which is to repeat the evaluation of local samples as shown in FIGS. 4-5, but the local samples are now defined around the existing waypoint closest to the proposed waypoint, which in this case is the point 530. Thus, a new set of local samples (e.g., a quantity of 16 as before; not shown on figure to preserve visual clarity) is defined around the point 530, and from the new set of local samples one point is selected which is feasible (collision-free) and closest to the same proposed waypoint 410 as before. This results in a new confirmed waypoint 610.

A new set of local samples (e.g., a quantity of 16 as before) is then defined around the new confirmed waypoint 610, and from the new set of local samples one point is selected which is feasible (collision-free) and closest to the same proposed waypoint 410 as before. This results in another new confirmed waypoint 620. This process—evaluating a set of local samples and selecting one which is feasible and which moves toward the proposed waypoint—may be repeated several times using the same proposed waypoint 410 before a new proposed waypoint is randomly defined. The number of times the local samples are evaluated before defining a new proposed waypoint is configurable, and may have a value such as 3, 5, 10 or some other number. The distance of the waypoints 530, 610 and 620 from the centerline of the slot 220 is exaggerated for visual effect.

The idea behind evaluating a set of local samples and selecting one which is feasible and which moves toward the proposed waypoint, and doing this multiple times for a given proposed waypoint, is to "slide" the moving part (the ball 210) out of the tightly-constrained region (the slot 220) of the fixed part (the structure 230). It can be seen in FIG. 6 that waypoints are accumulated (the points 530, 610 and 620) in a direction moving out of the slot 220 toward open space.

The objective of this motion planning method is to escape the tightly-constrained region 260 and enter the loosely-constrained region 250, from where a path back to the initial configuration 210A can easily be found due to the lack of constraints.

After the waypoint 620 is added to the motion plan, a new random waypoint configuration may be proposed to replace the proposed waypoint 410. The new proposed waypoint could be anywhere in the configuration space of the workspace 420. Then a set of local samples around the waypoint 620 would be defined and evaluated to determine which of the local samples is feasible and closest to the new proposed waypoint.

Figure 7:
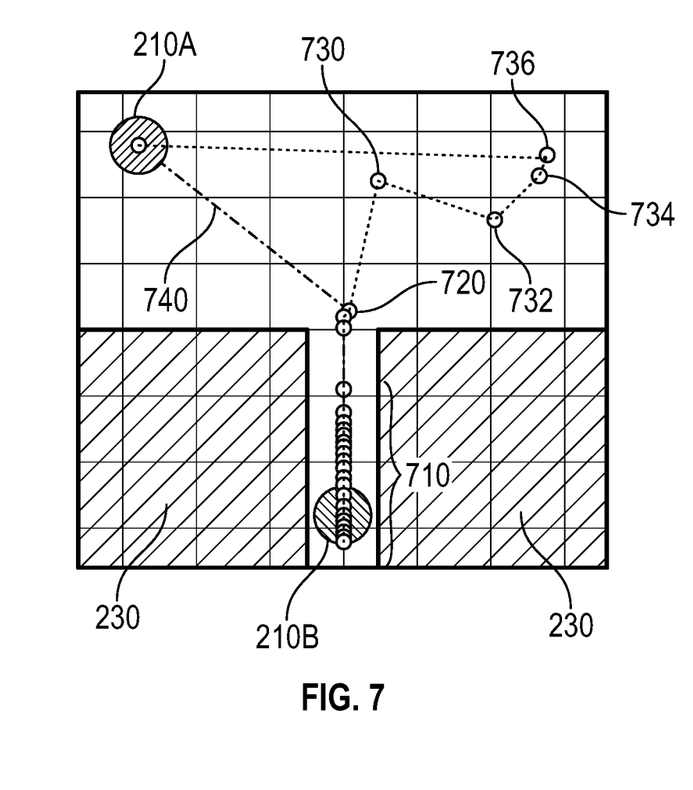
FIG. 7 is an illustration of the ball and slot assembly arrangement of FIGS. 4-6, where additional randomly-selected configurations and local searches escape the tightly-constrained region and find a complete path back to the initial configuration, according to an embodiment of the present disclosure.

FIG. 7 is an illustration of the ball and slot assembly arrangement of FIGS. 4-6, where additional randomly-selected configurations and local searches escape the tightly-constrained region and find a complete path back to the initial configuration, according to an embodiment of the present disclosure. In the manner discussed above, a proposed waypoint is defined and multiple sets of local samples are evaluated, and this process is repeated several times to accumulate confirmed feasible waypoints leading away from the target configuration 210B. This process is repeated as many times as necessary to escape the tightly-constrained region 260 (escape the slot 220), resulting in a set 710 of confirmed waypoints moving up the slot 220. Eventually, a waypoint 720 will be confirmed which is in the loosely-constrained region 250. Thereafter, proposed waypoints are defined and local samples are evaluated which may be located anywhere in the loosely-constrained region 250 and easily find their way back to the initial configuration 210A. This is illustrated in the upper part of FIG. 7, and results in additional waypoints 730, 732, 734 and 736.

It can be seen in FIG. 7 that a motion plan has been defined where the ball 210 travels from the target configuration 210B, upward along the set 710 of points in the slot to the point 720, then through the waypoints 730, 732, 734 and 736, and back to the initial configuration 210A. This motion plan needs to be reversed in order to perform the desired operation, which is moving the ball 210 from the initial configuration 210A to the target configuration 210B. In addition, it is advantageous to trim to unnecessary motions from the action sequence—for example, it can quickly be determined that the motion sequence can proceed collision-free from the initial configuration 210A to the waypoint 720 in the loosely-constrained region 250, thereby eliminating the wasted motion through the waypoints 730-736.

A final motion sequence 740 may be used to efficiently move the ball 210 from the initial configuration 210A to the waypoint 720, then through some (not necessarily all) of the waypoints in the slot 220, until reaching the target configuration 210B.

The preceding discussion of FIGS. 4-7 illustrated the motion planning techniques of the present disclosure in terms of the two-dimensional ball and slot assembly and the workspace 240. The use of a two-dimensional example to illustrate the disclosed techniques was simply for clarity and ease of understanding. It is to be understood that the techniques applied to each of the waypoints and configurations shown in two dimensions in FIGS. 4-7 (x and y position) is applicable to the configurations of one 3D component relative to another in three dimensions and six DOF (x/y/z positions and three rotation angles). Likewise, the simple collision avoidance calculations of FIGS. 4-7 (whether the ball 210 interferes with the structure 230) correspond with minimum distance and collision avoidance calculations between two 3D geometric models. These techniques provide an efficient and effective method of planning a motion sequence for the assembly of one component with another.

Figure 8A:
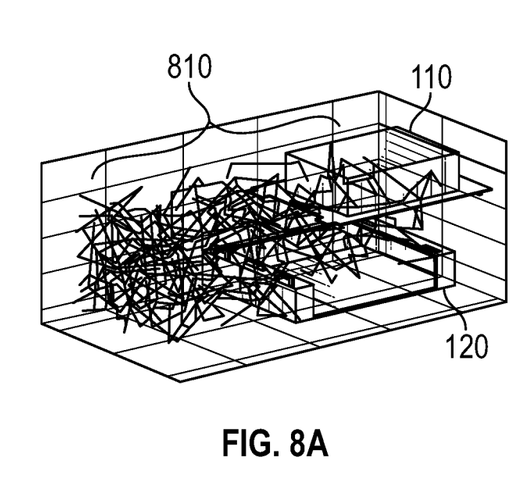
Figure 8B:
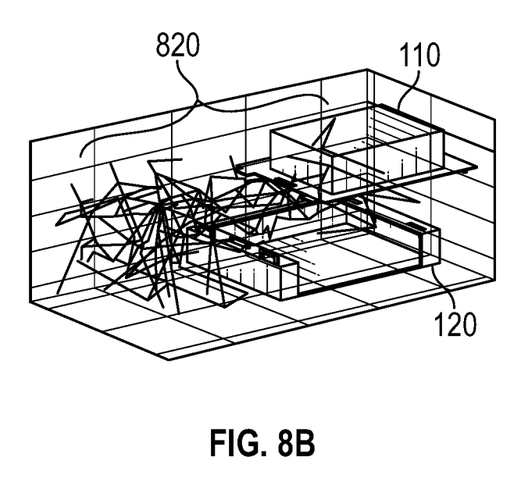
Figure 8C:
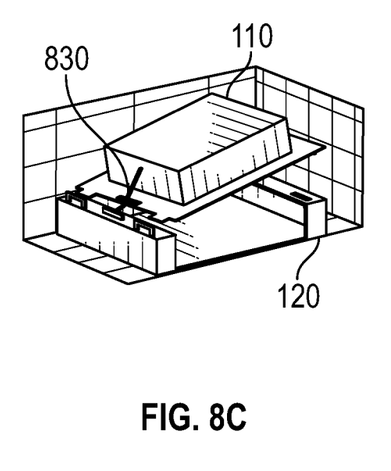

FIGS. 8A, 8B and 8C are illustrations of the two components being assembled as shown in FIGS. 1A, 1B, 1C and 1D, where FIG. 8A shows motion planning results from an RRT technique known in the art, FIG. 8B shows motion planning results from an RRT-Connect technique known in the art, and FIG. 8C shows motion planning results from the techniques of the present disclosure. In head-to-head computations, the techniques of the present disclosure delivered a valid motion plan much faster and more efficiently than either the RRT or RRT-Connect techniques.

FIG. 8A shows the parts 110 and 120 in their initial configuration, and partial computation results using the RRT method. The RRT method was slowest, because it evaluates an enormous number of unproductive waypoints and each branch of the tree has an extremely low probability of finding its way into the tightly-constrained region of assembly. This is illustrated by the nodes and branches of a tree indicated at reference 810.

FIG. 8B shows the parts 110 and 120 in their initial configuration, and partial computation results using the RRT-Connect method. The RRT-Connect method, which starts its tree-building from both the initial and target configurations until they connect, was more efficient than RRT, but still much slower than the methods of the present disclosure. This is illustrated by the nodes and branches of a tree indicated at reference 820.

FIG. 8C shows the parts 110 and 120 in a partially-assembled configuration, as a motion plan 830 has already been computed by the techniques of the present disclosure and is being executed by a robot, while the RRT and RRT-Connect methods are still computing. These figures—with the RRT and RRT-Connect methods taking much longer to find an assembly motion sequence than the methods of the present disclosure—reflect the results of the actual head-to-head computations mentioned above.

Figure 9:
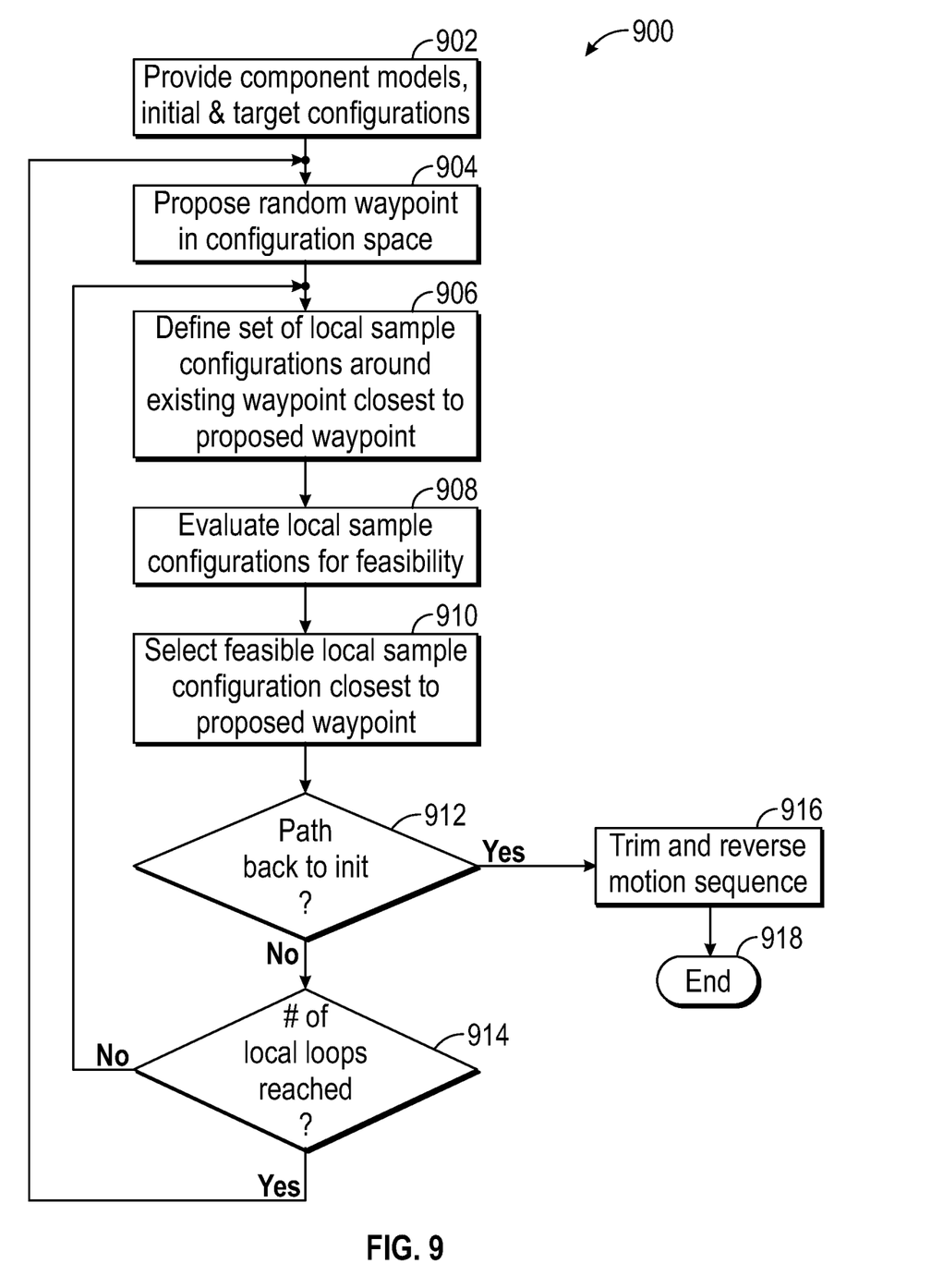
FIG. 9 is a flowchart diagram of a method for robotic component assembly motion planning using a disassembly-based process with local searching to escape a tightly-constrained region, according to an embodiment of the present disclosure.

FIG. 9 is a flowchart diagram 900 of a method for robotic component assembly motion planning using a disassembly-based process with local searching to escape a tightly-constrained region, according to an embodiment of the present disclosure. At box 902, geometric models of two components are provided, along with initial and target configurations. As discussed above, the geometric models may be solid or surface models of the components from a CAD system, and the initial and target configurations define the position and orientation of the components in a common fixed coordinate frame. Typically, one of the components does not move, and the other component is moved from its initial configuration to the target configuration where it is assembled with the fixed component; this is consistent with the ball-in-slot example of FIGS. 2-7, and also the computer chassis component assembly example of FIGS. 1 and 8.

At box 904, beginning from the target configuration, a random waypoint is proposed in configuration space. The random waypoint and all other samples and waypoints represent movement of one component (being moved by the robot) relative to the other component (fixed in position) during the assembly operation. At box 906, a set of local samples are defined around the existing waypoint closest to the proposed waypoint—which is initially the target configuration. The quantity of local samples and their range in configuration space from the current working point are definable parameters in a computer implementation of the method.

At box 908, each of the local samples is evaluated to determine if it is collision-free by positioning the geometric models of the components according to the sample configuration and checking for interference. At box 910, one of the local samples is selected which is feasible (collision-free) and is located closest in configuration space to the random proposed waypoint. At decision diamond 912, it is determined whether a waypoint or local sample point is coincident with (or within a tolerance range of) the initial configuration. If no waypoint has been defined at the initial configuration, the process continues on to a decision diamond 914.

At the decision diamond 914, it is determined whether a predefined threshold number of local sample loops has been reached. If the number of local sample loops has not been reached, then the process loops back to the box 906, where a new set of local samples are defined around the existing waypoint closest to the proposed waypoint—which is now the local sample point which was selected at the box 910. This new set of local samples is then evaluated for feasibility and proximity to the same waypoint previously proposed at the box 904. The predefined threshold number of local sample loops is a configurable parameter, and may be set to a number in a range of three to ten, for example, to achieve the best results.

If, at the decision diamond 914, the number of local sample loops has been reached, then the process loops back to the box 904, where a new random waypoint is proposed. A new set of local samples is then defined around the existing waypoint closest to the proposed waypoint. Each of the local sample points which is selected at the box 910 becomes part of a saved path of waypoints. The looping back from the decision diamond 914 to the box 904 or the box 906 continues until the path of waypoints finds its way back to the initial configuration which was provided at the box 902. When the initial configuration is reached at the decision diamond 912, the process moves to box 916. At the box 916, the motion sequence is trimmed to eliminate wasted motion, and reversed to provide a final motion sequence from the initial configuration to the target configuration (that is, the final motion sequence is in the direction of component assembly, where the planning computations were performed in the direction of disassembly). The process ends at a terminus 918.

Trimming the motion sequence at the box 916 includes short-cutting any path points that increase path distance unnecessarily (when not necessary to avoid an obstacle collision). Trimming the motion sequence may also include reducing the number of path points in areas of very dense point spacing, as was explained with respect to FIG. 7. The final motion sequence is then made available to a robot controller, which will grasp one component (i.e., the part 110) and move it along the final motion sequence to assemble it to the other component (i.e., the part 120). The computational steps of the flowchart diagram 900 may be performed on any suitable computer/processor, and the final motion sequence provided to the robot controller for execution. Alternately, the computational steps of the flowchart diagram 900 may be performed on the robot controller itself.

It is important to remember that the final motion sequence for moving one component relative to the other is not just a series of points, but is a series of three positions and three orientations in configuration space. That is, each waypoint, random sample and saved point discussed above is a complete six DOF configuration (pose) of the movable part in the workspace coordinate frame. The robot performing the assembly manipulates the movable part with the translations and rotations necessary to match each sequential configuration in the motion sequence.

Throughout the preceding discussion, various computers and controllers are described and implied. It is to be understood that the software applications and modules of these computers and controllers are executed on one or more computing devices having a processor and a memory module. In particular, this includes a processor in each of the robot controller and the other computer (if used) discussed above. Specifically, the processor in the controller and/or the other computer is configured to perform the disassembly-based assembly motion planning technique using local constraint-escaping searching in the manner described and shown throughout the foregoing disclosure.

As outlined above, the disclosed techniques for disassembly-based assembly motion planning using local constraint-escaping search provide significant advantages over prior art methods. By starting at the target configuration and using a local search loop to escape the tightly-constrained region, the disclosed technique is much faster and more efficient than prior art RRT-based assembly motion planning techniques, while also being applicable to complex component shapes unlike prior art rules-based assembly motion planning techniques.

While a number of exemplary aspects and embodiments of the disassembly-based assembly motion planning technique using local constraint-escaping search have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for planning a robotic component assembly motion, said method comprising:
providing geometric models of first and second components to be assembled, an initial configuration and a target configuration of the first component relative to the second component;
defining the target configuration as a first instance of a stored waypoint;
randomly selecting a proposed waypoint in a configuration space;
defining a set of local sample configurations around a stored waypoint closest to the proposed waypoint;
evaluating each of the local sample configurations to identify one which is collision-free and is closest to the proposed waypoint in the configuration space, and adding the identified local sample configuration as a new stored waypoint;
when a new stored waypoint is added at the initial configuration, reversing a sequence of the stored waypoints to provide the assembly motion;
defining a new set of local sample configurations when a local sample loop count quota has not been reached; and
randomly selecting a new proposed waypoint configuration.

2. The method according to claim 1 further comprising removing from the assembly motion any of the stored waypoints which can be eliminated without causing a component interference condition during the assembly motion.

3. The method according to claim 1 further comprising providing the assembly motion to an industrial robot, by a robot controller, and assembling the first component to the second component using the assembly motion by the robot.

4. The method according to claim 1 wherein each waypoint and sample configuration in the configuration space includes a three dimensional position and three orientation angles of the first component relative to the second component.

5. The method according to claim 1 wherein the local sample configurations are within a predefined range of distances and rotational angles of the stored waypoint closest to the proposed waypoint.

6. The method according to claim 1 wherein evaluating each of the local sample configurations to identify one which is collision-free includes performing a mathematical interference check of the geometric models of the first and second components.

7. The method according to claim 1 wherein evaluating each of the local sample configurations to identify one which is closest to the proposed waypoint in configuration space includes using a weighted sum of a translational difference term and a rotational difference term.

8. The method according to claim 7 wherein the translational difference term is the sum of the squares of the differences in x, y and z position of the sample configuration relative to the proposed waypoint, and the rotational difference term is the sum of the squares of the differences in angular positions of the sample configuration relative to the proposed waypoint.

9. The method according to claim 1 wherein the set of local sample configurations has a predefined number of local sample configurations.

10. The method according to claim 1 wherein the local sample loop count quota is predefined.

11. The method according to claim 1 wherein the stored waypoint being added at the initial configuration includes the stored waypoint being added within a predefined range of distances and rotational angles of the initial configuration.

12. The method according to claim 1 wherein the assembly motion includes a sequence of waypoints beginning with the initial configuration and ending with the target configuration, where each waypoint is a six degree of freedom configuration of the first component relative to the second component.

13. A method for planning a robotic component assembly motion, said method comprising providing geometric models of first and second components in an initial configuration and a target configuration, defining the target configuration as a first instance of a stored waypoint, evaluating a set of local samples around a stored waypoint closest to a proposed waypoint to identify a new stored waypoint which is one of the local samples which is collision-free and is closest to the proposed waypoint, repeatedly evaluating a new set of local samples relative to the proposed waypoint, and additional new sets of local samples relative to new proposed waypoints, until a new stored waypoint is located within a tolerance range of the initial configuration, and reversing a sequence of the stored waypoints to provide the assembly motion.

14. The method according to claim 13 further comprising removing from the assembly motion any of the stored waypoints which can be eliminated without causing a component interference condition during the assembly motion.

15. The method according to claim 13 wherein each waypoint and local sample includes a three dimensional position and three orientation angles of the first component relative to the second component.

16. The method according to claim 13 wherein the local samples are within a predefined range of distances and rotational angles of the stored waypoint closest to the proposed waypoint.

17. The method according to claim 13 wherein evaluating the set of local samples to identify one of the local samples which is collision-free includes performing a mathematical interference check of the geometric models of the first and second components.

18. The method according to claim 13 wherein evaluating the set of local samples to identify one of the local samples which is closest to the proposed waypoint includes using a weighted sum of a translational difference term and a rotational difference term.

19. The method according to claim 18 wherein the translational difference term is the sum of the squares of the differences in x, y and z position of the sample relative to the proposed waypoint, and the rotational difference term is the sum of the squares of the differences in angular positions of the sample relative to the proposed waypoint.

20. The method according to claim 13 wherein the assembly motion includes a sequence of waypoints beginning with the initial configuration and ending with the target configuration, where each waypoint is a six degree of freedom configuration of the first component relative to the second component.

* * * * *